United States Patent
Faaborg et al.

(10) Patent No.: US 8,738,292 B1
(45) Date of Patent: May 27, 2014

(54) PREDICTIVE TRANSIT CALCULATIONS

(71) Applicant: Google, Inc., Mountain View, CA (US)

(72) Inventors: Alexander Faaborg, Mountain View, CA (US); Antonio Bernardo Monteiro Costa, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/920,876

(22) Filed: Jun. 18, 2013

Related U.S. Application Data

(60) Provisional application No. 61/823,257, filed on May 14, 2013.

(51) Int. Cl.
*G01C 21/26* (2006.01)
*G06F 19/00* (2011.01)

(52) U.S. Cl.
USPC .......................................... 701/537; 701/117

(58) Field of Classification Search
USPC .................................. 701/537, 117
See application file for complete search history.

(56) References Cited

U.S. PATENT DOCUMENTS

| 2010/0268462 | A1 | 10/2010 | Tebbit et al. | |
|---|---|---|---|---|
| 2011/0130950 | A1* | 6/2011 | Wexler et al. | 701/200 |
| 2012/0010803 | A1* | 1/2012 | Min et al. | 701/117 |
| 2012/0173135 | A1* | 7/2012 | Gutman | 701/408 |

FOREIGN PATENT DOCUMENTS

| EP | 1916850 B1 | 6/2010 |
|---|---|---|
| JP | 2008172820 A * | 7/2008 |

* cited by examiner

*Primary Examiner* — Fadey Jabr
*Assistant Examiner* — Yazan A Soofi
(74) *Attorney, Agent, or Firm* — Shumaker & Sieffert, P.A.

(57) ABSTRACT

A computing device is described that determines an exit location at which a user of a computing device exited a stop associated with a transportation service. The computing device determines a predicted duration of travel by the user from a current location of the computing device to the exit location at which the user exited the stop associated with the transportation service. The computing device outputs, for display, a notification based at least in part on the predicted duration.

22 Claims, 5 Drawing Sheets

PREDICTIVE TRANSIT CALCULATIONS

This application claims the benefit of U.S. Provisional Application No. 61/823,257 filed May 14, 2013, the entire content of which is hereby incorporated by reference.

BACKGROUND

A mobile computing device (e.g., a mobile phone, tablet computer, etc.) may offer a variety of functionality and features. When traveling, a user may employ such a mobile computing device to keep track of time, to navigate, and/or to search for information relevant to a current trip and/or destination.

While access to large amounts of information may be beneficial to a user, a mobile computing device may not always present requested information in an organized way. For example, rather than allowing entry of a single search with the mobile computing device to determine an appropriate departure time for traveling to a mass transit station (e.g., a bus stop, subway or train station), a mobile computing device and/or search service may require the user may need to submit multiple, related searches with the mobile computing device (e.g., to find directions to the station, to determine an estimated travel time to the station, to estimate a time of departure from the station, etc.) and manually evaluate the results of these searches to determine an appropriate departure time to facilitate arrival at a destination by a predetermined time.

SUMMARY

In one example, the disclosure is directed to a method that includes determining an exit location at which a user of a computing device exited a stop associated with a transportation service. The method further includes determining a predicted duration of travel by the user from a current location of the computing device to the exit location at which the user exited the stop associated with the transportation service, and outputting, by the computing device and for display, a notification based at least in part on the predicted duration.

In one example, the disclosure is directed to a system that includes a display device, at least one processor, and at least one module operable by the at least one processor to determine an exit location at which a user exited a stop associated with a transportation service, and determine a predicted duration of travel by the user from a current location of the system to the exit location at which the user exited the stop associated with the transportation service. The at least one module is further operable by the at least one processor to output, for display at the display device, a notification based at least in part on the predicted duration.

In one example, the disclosure is directed to a system that includes at least one processor, and at least one module operable by the at least one processor to receive, from a mobile computing device, information that indicates a current location of a mobile computing device. In response to determining that the current location is within a distance threshold of a route of a transportation service, the at least one module is further operable by the at least one processor to determine, that a user associated with the mobile computing device is using the transportation service, and transmit, to the mobile computing device, an indication that the user associated with the mobile computing device is using the transportation service.

The details of one or more examples are set forth in the accompanying drawings and the description below. Other features, objects, and advantages of the disclosure will be apparent from the description and drawings, and from the claims.

DETAILED DESCRIPTION

Figure 1:
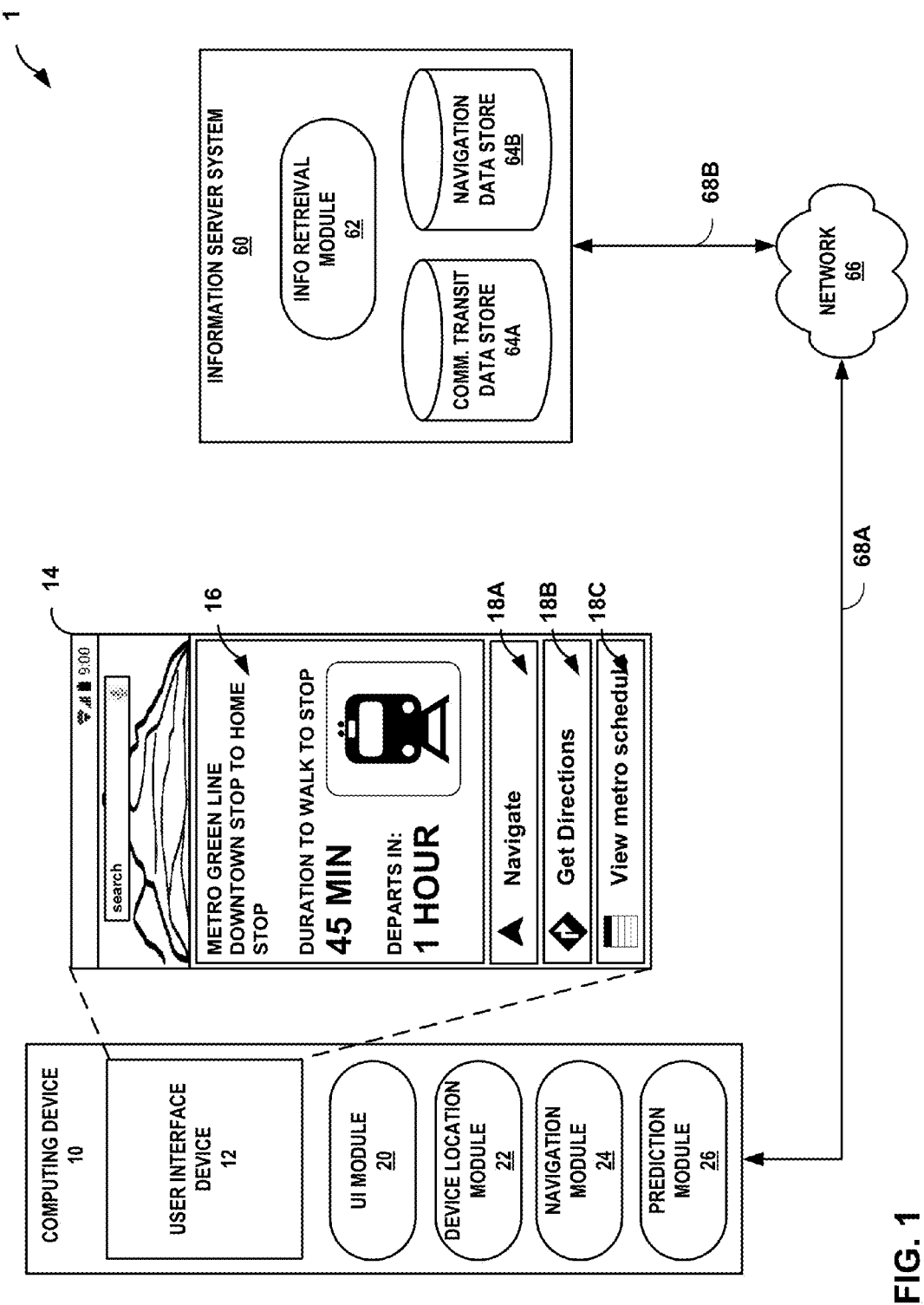
FIG. 1 is a conceptual diagram illustrating an example computing system configured to present information related to a transportation service, in accordance with one or more aspects of the present disclosure.

In general, techniques of this disclosure may enable a computing device to determine information related to travel using a transportation service and present the information at a time when the information is determined to likely be of interest to a user. Examples of transportation services are any transportations services, whether commercially owned, privately owned, publicly owned, government owned, military owned, or owned and/or organized by any other entity, that carry one or more passengers from one geographic location to another geographic location using railway cars, subway cars, trams, trolleys, buses, taxicabs, shuttles, monorails, airplanes, ferries, boats, ships, water taxis, automobiles, or any other type of transportation vehicle.

The computing device may tailor the information to specific circumstances that the device predicts about a user's travel in a geographic area. In other words, rather than present general information about a transportation service operating near a current location of the computing device, the computing device may determine certain characteristics of a user's current and/or planned trip (e.g., a current location, a point of origin along a line of the transportation service, an exit location along the line, a return time, and the like), and present information, based on the characteristics, specifically related to the user's current and/or planned trip. In some implementations, the computing device may output a notification or alert that includes an indication of this specific information without requiring a user to submit a search request for the information. In this manner, a user may not need to submit a search request with the computing device to obtain a specific piece of travel-related information or an answer to a specific travel-related question. The computing device may thus make traveling using transportation services easier by automatically providing travel information that includes answers to specific travel related questions without requiring the user to submit an additional search request for the travel information.

Throughout the disclosure, examples are described where a computing device may analyze information (e.g., locations, speeds, etc.) associated with the computing device only if the computing device receives permission from the user to analyze the information. For example, in situations discussed below in which the computing device may collect or may make use of information associated with the user and the computing device, the user may be provided with an opportunity to provide input to control whether programs or features of the computing device can collect and make use of user information (e.g., information about a user's e-mail, a user's social network, social actions or activities, profession, a user's preferences, or a user's past and current location), or to dictate whether and/or how to the computing device may receive content that may be relevant to the user. In addition, certain data may be treated in one or more ways before it is stored or used by the computing device, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device.

FIG. 1 is a conceptual diagram illustrating example computing system 1 that is configured to present information related to a transportation service, in accordance with one or more aspects of the present disclosure. System 1 includes computing device 10, information server system 60, and network 66.

Network 66 represents any public or private communication network. Computing device 10 and information server system 60 may send and receive data across network 66 using any suitable communication techniques. For example, computing device 10 may be operatively coupled to network 66 using network link 68A. Information server system 60 may be operatively coupled to network 66 by network link 68B. Network 66 may include network hubs, network switches, network routers, etc., that are operatively inter-coupled thereby providing for the exchange of information between computing device 10 and information server system 60. In some examples, network links 68A and 68B may be Ethernet, ATM or other network connections. Such connections may be wireless and/or wired connections.

Information server system 60 of system 1 represents any suitable remote computing system, such as one or more desktop computers, laptop computers, mainframes, servers, cloud computing systems, etc. capable of sending and receiving information across network link 68B to network 66. In some examples, information server system 60 represents a cloud computing system that provides one or more services through network 66. One or more computing devices, such as computing device 10, may access the one or more services provided by the cloud using information server system 60. For example, computing device 10 may store and/or access data in the cloud using information server system 60.

Information server system 60 includes information retrieval module 62, commercial transit data store 64A and navigation data store 64B. Information retrieval module 62 may perform operations described using software, hardware, firmware, or a mixture of hardware, software, and firmware residing in and/or executing at Information server system 60. Information server system 60 may execute information retrieval module 62 with multiple processors or multiple devices. Information server system 60 may execute information retrieval module 62 as a virtual machine executing on underlying hardware. Information retrieval module 62 may execute as a service of an operating system or computing platform. Information retrieval module 62 may execute as one or more executable programs at an application layer of a computing platform.

Data stores 64A and 64B represent any suitable storage medium for storing data related to navigation and transportation services. For example, data stores 64A and 64B may store data accessed by computing device 10 such as, digital maps, transit schedules, locations of transit lines, passenger flows through transit stops and stations, navigation durations, navigation directions, and the like. Information server system may provide the data stored at data stored 64A and 64B as a cloud based service to devices connected to network 66, such as computing device 10.

Information retrieval module 62 may perform functions for responding to information requests from computing device 10. For instance, information retrieval module 62 may receive a request from computing device 10 via network link 68B for an estimated duration of time to walk from one geographical location to another. Information retrieval module 62 may access data within data store 64B which includes directions and estimated durations to travel between various geographical locations around the world. Information retrieval module 62 may access data on the Internet and not stored locally in either data stores 64A or 64B to determine information for responding to information requests. In response to a request for information, information retrieval module 62 may send data to computing device 10, via network link 68B and through network 66.

In the example of FIG. 1, computing device 10 may be a mobile computing device, such as a mobile phone, a tablet computer, a personal digital assistant (PDA), a laptop computer, a portable gaming device, a portable media player, an e-book reader, a watch, a television platform, an automobile navigation system, a wearable computing platform, or any other type of computing device. As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to the user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface (e.g., user interface 14) which may be associated with functionality provided by computing device 10. For example, UID 12 may present various user interfaces of applications executing at or accessible by computing device 10 (e.g., an electronic message application, a navigation application, an Internet browser application, etc.). A user may interact with a respective user interface of an application to cause computing device 10 to perform operations relating to a function.

Computing device 10 may include user interface ("UI") module 20, device location module 22, navigation module 24, and prediction module 26. Modules 20, 22, 24, and 26 may perform operations described using software, hardware, firmware, or a mixture of hardware, software, and firmware residing in and/or executing at computing device 10. Computing device 10 may execute modules 20, 22, 24, and 26 with multiple processors. Computing device 10 may execute modules 20, 22, 24, and 26 as a virtual machine executing on underlying hardware. Modules 20, 22, 24, and 26 may execute as one or more services of an operating system, a computing platform. Modules 20, 22, 24, and 26 may execute as one or more remote computing services, such as one or more services provided by a cloud and/or cluster based computing system. Modules 20, 22, 24, and 26 may execute as one or more executable programs at an application layer of a computing platform.

UI module 20 may cause UID 12 to present user interface 14. User interface 14 includes graphical indications (e.g., elements) displayed at various locations of UID 12. FIG. 1 illustrates information card 16 ("card 16") as one example graphical indication within user interface 14. FIG. 1 also illustrates buttons 18A, 18B, and 18C (collectively "buttons 18") as an additional example of graphical indications within user interface 14 for selecting options or performing additional functions related to the information within card 16. As described in more detail below, card 16 includes information related to using a commercial transportations service based on context (e.g., time data, location data, gyroscope and/or accelerometer data, other sensor data, etc.) of computing device 10. UI module 20 may receive the information from prediction module 26, for instance, when computing device 10 determines a predicted duration of travel by the user from a current location of computing device 10 to a location at which the user exited a transportation service. UI module 20 may update user interface 14 with card 16 to include information and may cause UID 12 to output, for display, card 16 within user interface 14.

Device location module 22 may determine a current location of computing device 10 and a current time. For example, computing device 10 may include a global positioning system (GPS) radio for receiving GPS signals (e.g., from a GPS satellite) having data corresponding to the current time and the current location of computing device 10. Device location module 22 may determine, based on the GPS signal data, the current location of computing device 10 and the current time. Computing device 10 may include other radios or sensor devices (e.g., cellular radio, Wi-Fi radio, etc.) capable of receiving signal data from which device location module 22 can determine the current location of computing device 10 and the current time.

In some examples, device location module 22 may determine a relative location and/or determine a current location based on signal triangulation (e.g., a technique for determining a single location based on relative position data received from two or more signals). In some examples, device location module 22 may determine location data as coordinate (e.g., GPS) location data. In other examples, device location module 22 may determine location data as one or more general or relative locations, such as an address, a place, a country, a city, a type of building (e.g., a library, an airport, etc.), a business, etc.

In some examples, device location module 22 may communicate with information server system 60 over a network 66 and obtain location data about the current location of computing device 10 or the current time from information server system 60. For instance, device location module 22 of computing device 10 may send GPS coordinates of computing device 10 and/or other information about computing device 10, such as a Wi-Fi network identifier associated with computing device 10 to information server system 60. Based on the information sent to information server system 60, device location module 22 may obtain a general or relative location of computing device 10, such as an address, a place, a country, a city, a type of building (e.g., a library, an airport, etc.), a business, etc., from the server. Device location module 22 may output location and time data to other modules of computing device 10 such as prediction module 26.

Navigation module 24 may obtain navigation and commercial transportation information on behalf of computing device 10. The navigation and commercial transportation information may be relevant to a time of day and/or a current location of computing device 10. Navigation module 24 may receive information about the current location and the time of day from device location module 22. In response to queries from prediction module 26, navigation module 24 may output navigation information and/or information related to a transportation service to prediction module 26.

Navigation module 24 may obtain a predicted amount of time (e.g., a predicted duration) and/or a set of directions for a user of computing device 10 to travel from a current geographic location to another geographic location at a particular time of day. Navigation module 24 may obtain the durations and/or directions for different modes of travel. For example, navigation module 24 may obtain the durations and/or directions for walking, biking, driving, flying, boating, etc., from one geographic location to another geographic location.

Navigation module 24 may obtain data related to transportation services. Examples of transportation services are any transportations services that carry one or more passengers from one geographic location to another geographic location using railway cars, subway cars, trams, trolleys, buses, taxicabs, shuttles, monorails, airplanes, ferries, boats, water taxis, automobiles, or any other type of transportation vehicle. Navigation module 24 may access and/or receive information (e.g., stored within databases, tables, or other data structures) about transportation schedules and specific locations (e.g., stops, stations, etc.) serviced by one or more transportation services. In addition, navigation module 24 may access and/or receive information about the reliability of transportation services, such as, past, current, and estimated future delays experienced by users of transportation services (e.g., passenger flows at stops or stations associated with transportation services).

Navigation module 24 may access and/or receive information about average, current, and/or future estimated amounts of time to purchase tickets and/or board the service after arriving at an entrance of the service (e.g., average, current, or future estimated time to purchase a ticket at a transportation service station and walk from the ticket counter to a platform of the transportation service). In one example, navigation module 24 may obtain the identities or locations of one or more transportation services and/or the individual lines or paths of transportation services that operate within a threshold distance of the current location of computing device 10.

Navigation module 24 may obtain navigation and transportation services information from data stored locally within computing device 10 and/or by obtaining information from information server system 60. For instance, to obtain durations, directions, and/or commercial transportation information, navigation module 24 may access data stored local at computing device 10. Navigation module 24 may, alternatively or additionally, send information about the current location of computing device 10 to information server system 60 to obtain navigation information and/or transportation service information. For example, navigation module 24 may obtain navigation directions, durations, locations, and any other navigation related information from information server system 60. In addition, navigation module 24 may obtain, from information server system 60, information about transportation services that provide transportations services within a threshold distance (e.g., within one mile, within one block, within a fifteen minute walk, etc.) of the current location of computing device 10.

Prediction module 26 may automatically and, in some examples, periodically, obtain, based in part on data from navigation module 24 and location module 22, context-based travel information determined to be of interest to a user at a particular time. For example, prediction module 26 may determine a mode of transportation being used by a user of computing device 10. Based on the mode of transportation of the user, prediction module 26 may obtain context-based travel information from navigation module 24 that may be more or less relevant to the user's mode of transportation given the current location and time of day received from device location module 22. The context-based travel information received from navigation module 24 may include information such as navigation directions, navigation durations, and/or transportation service information.

Prediction module 26 may cause UI module 20 to present context-based travel information for inclusion in card 16 of user interface 14 at UID 12. Prediction module 26 may cause UI module 20 to present context-based travel information at UID 12 at a particular time of day that prediction module 26 determines that the context-based travel information may be of interest to the user. For example, in response to determining that the user of computing device 10 has exited a transportation service at a stop of the transportation service, prediction module 26 may determine a next scheduled departure of the transportation service from the stop. Prediction module 26 may determine an appropriate time of day to alert a user about the next scheduled departure. For instance, prediction module 26 may determine a time of day prior to the next scheduled departure time that may allow a user sufficient time to travel by foot back to the stop to arrive in time to catch the next scheduled departure. At the appropriate time of day, prediction module 26 may cause UI module 20 to present context-based travel information (e.g., the time associated with the next scheduled departure as well as an estimated duration of time for to walk from the current location of computing device 10 back to the stop) within card 16 at UID 12.

Computing device 10 may determine that a user associated with computing device 10 is using a transportation service. For example, a user may wish to travel by train from a home location in a suburb to a final location (e.g., a restaurant) in a city. After boarding a vehicle associated with a transportation service (e.g., a train car, a bus, etc.) at a point of origin near the user's home location (e.g., a home stop), prediction module 26 may determine that the user associated with computing device 10 is using a transportation service.

In some examples, prediction module 26 may determine a speed or acceleration of computing device 10 as an indication of whether the user is using a transportation service. For example, prediction module 26 may determine, based on the current location and time data obtained from device location module 22 and/or sensor data from a gyroscope, accelerometer, etc., a speed of computing device 10. Prediction module 26 may determine that the speed satisfies a threshold speed for travel using a transportation service. Based on the determined speed associated with computing device 10 and commercial transportation information obtained from navigation module 24 that indicates that the current location does correspond to a location along a line of the transportation service, prediction module 26 may determine that the user is using the transportation service.

In some examples, prediction module 26 may receive information from information server system 60 that indicates the user is using the transportation service. For example, information server system 60 may receive information from computing device 10 that indicates the current location and/or current speed of computing device 10 and determine that the current location corresponds to a location along a route of a transportation service and that the current speed satisfies a speed threshold of a vehicle associated with the transportation service. Prediction module 26 may receive, from information server system 60, an indication of the determination that the user associated with computing device 10 is traveling using the transportation service.

Computing device 10 may determine that the user has exited the transportation service. In other words, computing device 10 may determine that a user has disembarked from a vehicle associated with a transportation service, traveled away from a location of a stop along a line of a transportation service, or otherwise stopped using a transportation service that the user was previously using. For example, the user may disembark from a transportation service at an exit location (e.g., a stop) in the city and begin walking away from the exit location to a final location (e.g., a restaurant, a museum, a store, etc.). While the user is walking away from the exit location, prediction module 26 may obtain navigation and transportation service information from navigation module 24 that indicates whether the current location of computing device 10 corresponds to a location associated with a transportation service. Based on the navigation and transportation service information from navigation module 24, prediction module 26 may determine that the user has traveled away from a location of a stop along a line of the transportation service and determine that the user has exited the transportation service.

In some examples, prediction module 26 may determine that the user is not using the transportation service based on the speed and/or acceleration of computing device 10. For instance, prediction module 26 may determine that the speed of computing device 10 does not satisfy a speed threshold for indicating that the user is using a transportation service. Based on the speed, prediction module 26 may determine that either the transportation service has momentarily paused at a stop and/or the user has disembarked from a vehicle associated with the transportation service. Based on the speed and navigation information from navigation module 24, prediction module 26 may determine that the transportation service has not momentarily paused, rather, the user has disembarked from the vehicle. Prediction module 26 may determine that, based on the reduction in speed and based on information obtained from navigation module 24 that indicates the current location does not correspond to a location of a transportation line (e.g., the current location associated with computing device 10 is not within a threshold distance of the line), that the user is no longer using the service and instead is exiting the service.

Responsive to determining that the user has exited the transportation service, computing device 10 may obtain a location at which the user exited the transportation service (e.g., an exit location). For example, in response to determining that the user is no longer using the transportation service, prediction module 26 may obtain information from navigation module 24 that indicates the location of a stop closest to the current location of computing device 10 and located on a line of the transportation service that the user was traveling on. For instance, navigation module 24 may query information server system 60 for the identity (e.g., as a street intersection, landmark, station, coordinates, etc.) and/or coordinate location of stops along the line of the transportation service that the user was traveling on and determine the closest located stop to the current location associated with computing device 10. In response to the request, information retrieval module 62 may obtain navigation information and commercial transportation information from data stores 64A and 64B and send the information to navigation module 24. Navigation module 24 may return portions of the information that indicate the identity and location of the closest stop to prediction module 26.

Computing device 10 may obtain a predicted duration of travel by the user from a current location of computing device 10 to the exit location at which the user exited the transportation service. For example, prediction module 26 may determine that the user may wish to return to the exit location (e.g., the closest stop to the location of computing device 10 when prediction module 26 determined that the user was no longer using the transportation service). Prediction module 26 may obtain, from navigation module 24, navigation information that indicates a predicted duration of time for the user to travel from the current location of computing device 10 to the exit location.

Navigation module 24 may query information retrieval module 62 for street level directions for the user to travel from the current location to the location of the exit location. Information retrieval module 62 may send information to navigation module 24 that indicates the street level directions as well as a predicted duration of travel time for a user to walk, run, bicycle, drive, etc. from the current location to the exit location using the directions. Navigation module 24 may send portions of the information that indicates the predicted duration of travel, received from information retrieval module 62, to prediction module 26.

Computing device 10 may output, for display, a notification based at least in part on the predicted duration. For example, prediction module 26 cause UI module 20 to output a notification that includes an indication of the predicted duration at UID 12 (e.g., UI module 20 may present the graphical indication of the notification as card 16 of user interface 14). In addition to the predicted duration, prediction module 26 may cause UI module 20 to present other types of context-based travel information at UID 12 within the notification. Other types of context-based travel information may include information about the schedule of a transportation service, passage flows, predicted durations of travel from the current location to the exit location by different modes of travel, etc.

In some examples, when computing device 10 outputs a notification based at least in part on the predicted duration, computing device 10 may present the indication of the predicted duration as text, a visual or graphical notification, or a combination thereof. For instance, prediction module 26 of computing device 10 may cause UI module 20 to present user interface 14 as part of a notification center graphical user interface that alerts a user to information such as a missed phone call, an incoming text message, etc. Prediction module 26 of computing device 10 may cause UI module 20 to output, for display, a graphical indication of a text-based and/or graphic-based notification that includes information associated with the predicted duration (e.g., a visual indication of the predicted duration as context-based travel information in a notification within the notification center graphical user interface).

In some examples, prediction module 26 may cause UI module 20 to present the notification based at least in part on the predicted duration and/or other context-based travel information at UID 12, at a specific (e.g., appropriate) time of day. For example, prediction module 26 may determine the appropriate time to cause UI module 20 to present context-based travel information based on a configuration setting, a determined user preference, or other information associated with the user and/or the transportation service that the user was using. In some examples, prediction module 26 may cause UI module 20 to present the indication of the predicted duration, and other context-based travel information at UID 12, in response to determining the information may be of interest to the user.

In some examples, prediction module 26 may determine an upcoming time at which the transportation service operates service from the exit location in the direction or to the point of origin. In other words, prediction module 26 may obtain or determine, transportation service information from navigation module 24 that indicates the time(s) of day (e.g., a schedule) that the service operates from the exit location, back to the location along the line of the transportation service that the user boarded the vehicle (e.g., the location from which the user originally began using the service). Prediction module 26 may provide schedule information that indicates the time(s), in addition to the predicted travel duration, as context-based travel information to UI module 20 for inclusion within GUI 14.

In some examples, computing device 10 and information service system 60 of system 1 may analyze information (e.g., locations, speeds, etc.) associated with computing device 10 only if system 1 receives permission from the user to analyze the information. For example, computing device 10 may only collect or make use of information associated with the user and computing device 10 (such as a current location, a current speed, an exit location, a point of origin, etc.) if the user explicitly provides access to user information and affirmatively controls system 1 to allow system 1 to collect and make use of user information (e.g., information about a user's e-mail, a user's social network, social actions or activities, profession, a user's preferences, or a user's past and current location). In addition, certain data used in system 1 may be treated in one or more ways before it is stored or used by system 1, so that personally identifiable information is removed. For example, a user's identity may be treated by system 1 so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by computing device 10 and information service system 60 of system 1.

In this way, techniques of this disclosure may enable a computing device to automatically present graphical indications of context-based travel information associated with a transportation service. By automatically presenting context-based travel information, a user may not need to submit multiple related search requests with the computing device to obtain a specific piece of commercial transportation information or to obtain the answer to a specific travel related question for using a transportation service that he or she is looking for. Additionally, if a user is distracted or otherwise immersed in an activity at a final travel destination, the computing device may automatically present commercial transportation information that the user may need rather than requiring the user to focus his or her attention away from the activity and proactively submit one or more search requests for the information.

Figure 2:
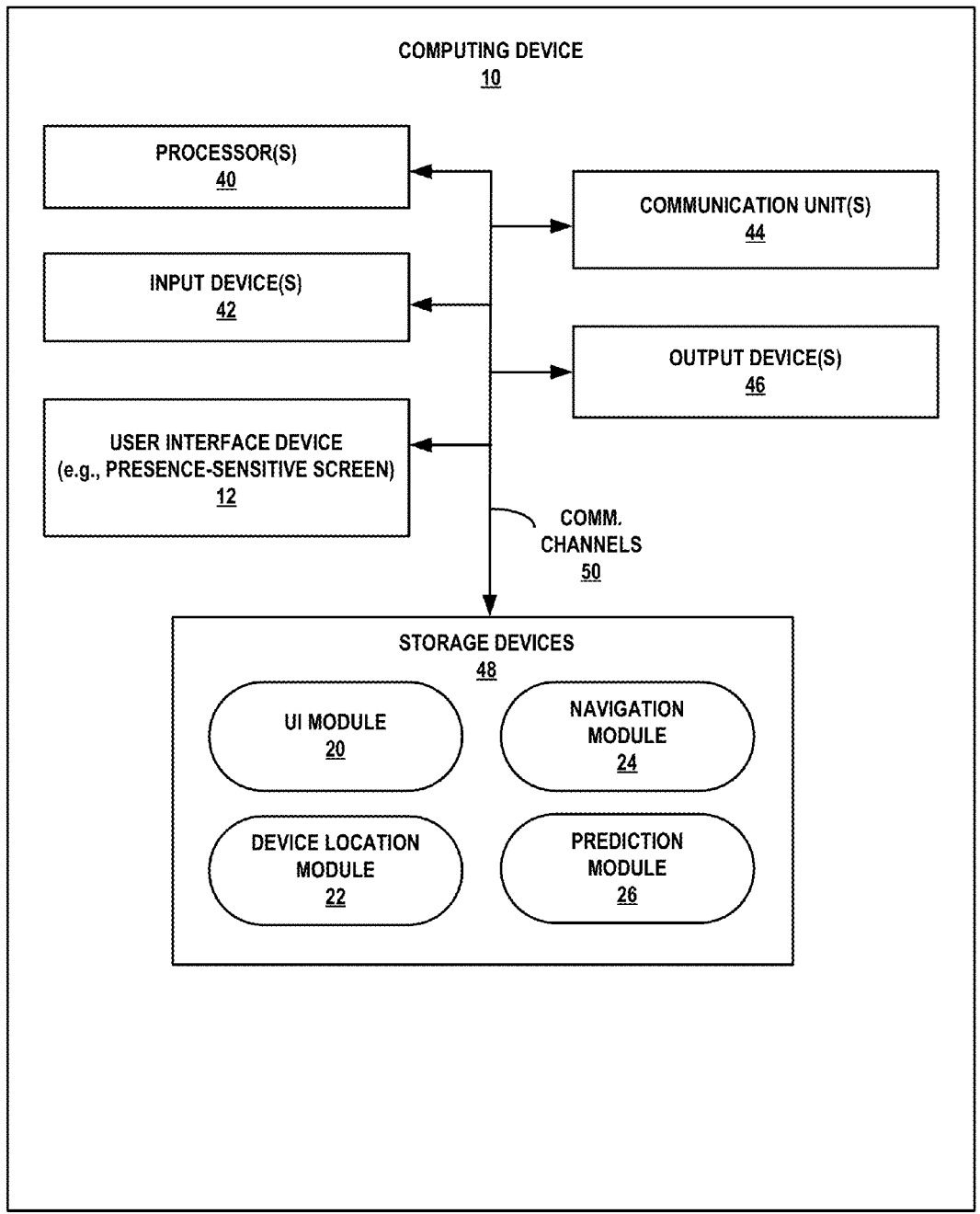
FIG. 2 is a block diagram illustrating an example computing device configured to present information related to a transportation service, in accordance with one or more aspects of the present disclosure.

FIG. 2 is a block diagram illustrating an example computing device, in accordance with one or more aspects of the present disclosure. Computing device 10 of FIG. 2 is described below within the context of system 1 of FIG. 1. FIG. 2 illustrates only one particular example of computing device 10 of system 1, and many other examples of computing device 10 may be used in other instances and may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, and one or more storage devices 48. Storage devices 48 of computing device 10 also include UI module 20, device location module 22, navigation module 24, and prediction module 26. Communication channels 50 may interconnect each of the components 12, 13, 20, 22, 24, 26, 40, 42, 44, and 46 for inter-component communications (physically, communicatively, and/or operatively). In some examples, communication channels 50 may include a system bus, a network connection, an inter-process communication data structure, or any other method for communicating data.

One or more input devices 42 of computing device 10 may receive input. Examples of input are tactile, audio, and video input. Input devices 42 of computing device 10, in one example, includes a presence-sensitive display, touch-sensitive screen, mouse, keyboard, voice responsive system, video camera, microphone or any other type of device for detecting input from a human or machine.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more communication units 44 of computing device 10 may communicate with external devices via one or more networks by transmitting and/or receiving network signals on the one or more networks. For example, computing device 10 may use communication unit 44 to send and receive data to and from information server system 60 of FIG. 1. Computing device 10 may use communication unit 44 to transmit and/or receive radio signals on a radio network such as a cellular radio network. Likewise, communication units 44 may transmit and/or receive satellite signals on a satellite network such as a global positioning system (GPS) network. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless Ethernet network radios, as well as universal serial bus (USB) controllers.

In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display. In the example of FIG. 2, UID 12 presents a user interface (such as user interface 14 of FIG. 1).

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data accessed by modules 20, 22, 24, and 26 during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, also include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or data associated with modules 20, 22, 24, and 26.

One or more processors 40 may implement functionality and/or execute instructions within computing device 10. For example, processors 40 on computing device 10 may receive and execute instructions stored by storage devices 48 that execute the functionality of UI module 20, device location module 22, navigation module 24, and prediction module 26. These instructions executed by processors 40 may cause computing device 10 to store information, within storage devices 48 during program execution. Processors 40 may execute instructions of modules 20, 22, 24, and 26 to cause UID 12 to present user interface 14 with information card 16 at UID 12. That is, modules 20, 22, 24, and 26 may be operable by processors 40 to perform various actions or functions of computing device 10, for instance, causing UID 12 to present user interface 14 at UID 12.

Computing device 10 of FIG. 2 may determine that a user associated with computing device 10 is using a transportation service. For example, a user of computing device 10 may board a vehicle associated with a transportation service at a point of origin (e.g., a stop) along a line of the transportation service near a home location. At a first point in time after boarding a vehicle at the point of origin, prediction module 26 may receive data over communication channels 50 from device location module 22 that indicates the current location of computing device 10 and the first point in time. At a later point in time, prediction module 26 may receive, from device location module 22, an updated current location associated with computing device 10.

Based on the location of computing device 10 at the first point in time and the updated current location received from device location module 22, prediction module 26 may determine a distance traveled between the location associated with computing device 10, at the first point in time, and the updated current location. Prediction module 26 may determine a speed associated with computing device 10 by determining a ratio between the distance traveled by computing device 10 and the duration of time between the first and later points in time. Prediction module 26 may compare the speed associated with computing device 10 to a speed threshold and based on the comparison, prediction module 26 may determine that the user is traveling by a mode of travel other than walking (e.g., prediction module 26 may determine that the speed associated with computing device 10 exceeds the speed that computing device 10 would move if the user was walking, jogging, running, etc.).

Prediction module 26 may request information about one or more lines of a transportation service from navigation module 24 that may operate within a distance threshold of the current location of computing device 10. Navigation module 24 may utilize communication units 44 to send a query to information server system 60 to obtain information about one or more lines of a transportation service that are within the distance threshold (e.g., three meters) to computing device 10. Navigation module 24 may send a portion of the information obtained from information server system 60 to prediction module 26. For example, navigation module 24 may send information to prediction module 26 that indicates the line of the of the transportation service within a distance threshold and/or the closest stop (e.g., the point of origin) along the line. Prediction module 26 may determine that the user is using a transportation service based on the speed of computing device 10 exceeding the speed that computing device 10 would move if the user was traveling by foot and further based on the current location corresponding to a location within a distance threshold of the line of a transportation service.

In some examples, computing device 10 may differentiate use of a transportation service from a different mode of transportation when routes cross and/or vehicles of the transportation service and the different mode move at similar speeds. In other words, computing device 10 may differentiate between a user riding on a bus or driving in an automobile on a street shared by a bus-related transportation service and personal automobiles. Computing device 10 may determine that slow or halted speeds at locations along the route that correspond to stops may indicate that the user is using the transportation service whereas, operations speeds at locations along the route that correspond to stops may indicate that the user is not using the transportation service.

For example, prediction module 26 of computing device 10 may determine, at first point in time, a first speed associated with computing device 10 at a first location that corresponds to a first stop along a route of the transportation service. In other words, prediction module 26 may obtain information from navigation module 24 that indicates that the current location corresponds to a stop along a route of a transportation service and may determine that the speed associated with computing device 10 while at the stop indicates that a vehicle associated with the transportation service is not moving (e.g., picking up or dropping off passengers). Prediction module 26 of computing device 10 may determine at a second point in time, a second speed associated with computing device 10 at a second location that corresponds to a second stop along the route of the transportation service. In other words, prediction module 26 may obtain information that indicates the current location corresponds to a second stop along the bus route and may determine that the speed associated with computing device 10 indicates that the vehicle is not moving (e.g., as the bus picks up or drops off additional passengers).

Prediction module 26 of computing device 10 may determine, based at least in part on the first speed and the second speed, that the user is using the transportation service and not traveling along the route using a different mode of transportation. Prediction module 26 may rely on additional or fewer indications of the location and/or speed associated with computing device 10 to determine whether the user is using transportation service.

Responsive to determining that the user has exited the a vehicle of the transportation service, prediction module 26 of computing device 10 may obtain or determine an exit location at which the user exited a stop associated with the transportation service. For example, prediction module 26 may periodically obtain updates from navigation module 24 that indicates whether a line of a transportation service is located within a distance threshold of the current location and determine updated speeds associated with computing device 10. Prediction module 26 may determine that the user is continuing to use the transportation service based on the updated information from navigation module 24 and the updated speed.

Eventually, after the user exits the transportation service at an exit location (e.g., a stop, a station, or other location for boarding and disembarking from a vehicle of the transportation service along a route of the transportation service) prediction module 26 may determine that the speed of computing device 10 does not exceed a speed that indicates the user is traveling by foot and obtain information that the current location of computing device 10 is not within a distance threshold of the line of the transportation service. In response to determining that the user has exited the transportation service (e.g., disembarked from a vehicle associated with the transportation service and/or traveled away from a stop along the line), based on the updated speed and information from navigation module 24, prediction module 26 may query navigation module 24 for a location of the nearest exit location. Navigation module 24 may obtain information about the closest exit location from information server system 60 and may send a portion of the information to prediction module 26 that identifies the exit location (e.g., the name of the stop).

Navigation module 24 of computing device 10 may obtain or determine a predicted duration of travel, by the user, from a current location of computing device 10 to the exit location at which the user exited the stop associated with the transportation service. For example, prediction module 26 may, automatically and/or periodically, request navigation information from navigation module 24 that indicates an estimated duration of time for the user to travel from a current location of computing device 10 back to the exit location. Navigation module 24 may use communication unit 44 to obtain navigation information from information server system 60 that represents navigation directions and a predicted duration of travel time for the user to travel from the current location of computing device 10 to the exit location.

Computing device 10 may output, for display, an indication of the predicted duration. For example, prediction module 26 may obtain the navigation directions and the predicted duration of travel from navigation module 24. Prediction module 26 may cause UI module 20 to output the predicted duration of travel for display at UID 12 as information within card 16 of GUI 14.

In some examples, prediction module 26 of computing device 10 may obtain, based at least in part on a current time and the predicted duration, one or more times of transportation services provided by the transportation service at the exit location. For example, prediction module 26 may obtain a current time of day from device location module 22. Prediction module 26 may determine, based on the current time and the predicted duration, a combined time. A combined time represents the earliest time of day that the user could travel from the current location associated with computing device 10 to the exit location. Prediction module 26 may obtain or determine one or more departure times from navigation module 24 that indicate the one or more next scheduled services of the transportation service, which depart from the exit location at a time of day that is later than the combined time. Prediction module 26 may cause UI module 20 to output an indication of the one or more departure times for display at UID 12. In other words, rather than simply cause UID 12 to present an estimated time for the user to travel from a current location at a particular time of day, UI module 20 may cause UID 12 to also present one or more departure times of the transportation service.

In some examples, in addition to determining a point of origin from which the user boarded the vehicle, prediction module 26 of computing device 10 may determine, based on the current location, a second predicted duration of travel, by the user, from the current location of the computing device to a second stop associated with the transportation service that is the stop located closest to the current location (e.g., closer to the current location than the stop associated with the exit location). In other words, prediction module 26 may obtain information about the location of one or more stops along a route of the transportation service and determine which of the one or more stops is closest or nearest (e.g., a shortest time or distance away) to the current location (e.g., a shorter time away, distance away, etc.). Prediction module 26 may determine, based at least in part on the current time, one or more departure times of transportation services provided by the transportation service from the nearest location to the point of origin and cause UI module 20 and UID 12 to output, for display, an indication of the one or more departure times. Said differently, prediction module 26 may provide an indication of one or more departure times of the transportation service from the stop nearest to the current location to indicate to the user a closest stop, station, etc. at which he or she may board a vehicle of the transportation service to return to the point of origin.

In some examples, prediction module 26 may cause UI module 20 to output one or more departure times of transportation services provided by the transportation service from the exit location to a point of origin (e.g., a location along a line of the transportation service from which the user began using the transportation service), for display at UID 12. For example, in response to determining that the user is using the transportation service, prediction module 26 of computing device 10 may obtain or determine, from navigation module 24, a point of origin (e.g., a location, a name, etc. of a stop along a line of the transportation service) from which the user boarded the vehicle of the transportation service and otherwise began using the transportation service. In response to a query to navigation module 24, prediction module 26 of computing device 10 may obtain or determine, based at least in part on a current time and the predicted duration, one or more departure times of transportation services provided by the transportation service from the exit location to the point of origin. In other words, prediction module 26 may obtain one or more departure times from navigation module 24 that indicate the one or more next scheduled services of the transportation service, which depart from the exit location at a time of day that is later than the combined time and provide service to the point of origin. Prediction module 26 may cause UI module 20 to output an indication of the one or more departure times for display at UID 12.

Computing device 10 may periodically update the information presented within card 16 as the user continues to travel and/or otherwise causes the current location of computing device 10 to be at a distance away from the exit location (e.g., the exit location along the line of the transportation service that the user exited from). For example, prediction module 26 of computing device 10 may obtain from navigation module 24, based on an updated current location of computing device 10, an updated predicted duration of travel, by the user, from the updated current location to the exit location. Prediction module 26 may cause UI module 20 to output, for display, an indication of the updated predicted duration at UID 12.

In some examples, prediction module 26 may cause UI module 20 and UID 12 to present navigation information within card 16 at a specific (e.g., appropriate) time to increase a degree of likelihood that the navigation information may be useful and of interest to the user. For instance, prediction module 26 may determine the appropriate time based on a configuration setting (e.g., the user may provide an input at computing device 10 to select a time to be notified about navigation information), a determined user preference (e.g., prediction module 26 may estimate the appropriate time based on past preferences or preferences of other similar users), or other information about the user and/or the transportation service (e.g., regardless of whether the user specified to be notified, prediction module 26 may always notify the user with navigation information about the last train of the day to leave the exit stop). In other words, prediction module 26 may cause UI module 20 to present navigation information at UID 12 at an appropriate time when prediction module 26 determines the information may be of more interest to the user.

Prediction module 26 of computing device 10 may determine, based at least in part on a schedule of the transportation service, an appropriate time to present the predicted duration. The appropriate time may represent a time of day that context-based travel information may be of interest to a user. In other words, prior to causing UI module 20 to present context-based travel information (e.g., the predicted duration) at UID 12, prediction module 26 may determine when (e.g., an appropriate time of day) that context-based travel information may be of interest to a user and prediction module 26 may cause UI module 20 to present the context-based travel information at UID 12, at the determined appropriate time.

The appropriate time may represent a time prior to a scheduled departure time (e.g., a next scheduled departure for the day, a last scheduled departure for the day, etc.) by at least the predicted duration. In other words, the appropriate time may occur prior to, by at least the predicted duration, a scheduled departure time of transportation service provided by the transportation service from the exit location. Prediction module 26 of computing device 10 may cause UI module 20 to output the predicted duration for display at UID 12, at the appropriate time. By presenting the predicted duration at the appropriate time, the user may be alerted to context-based travel information at UID 12 with sufficient time to travel from his or her current location to the exit location.

Prediction module 26 of computing device 10 may obtain, based on the schedule, at least one departure time of transportation services provided by the transportation service from the exit location. For example, navigation module 24 may provide transportation service information to prediction module 26 that indicates a time that a vehicle (e.g., a train) associated with the transportation service departs from the exit location. Prediction module 26 of computing device 10 may determine the appropriate time based at least in part on a current time, the at least one departure time, and the predicted duration. The appropriate time may occur prior to the at least one departure time by at least the predicted duration. For example, prediction module 26 may determine that the appropriate time to cause UI module 20 to output context-based travel information at UID 12 is a time prior to the departure time that the vehicle is scheduled to depart from the exit location. Prediction module 26 may further determine the appropriate time so the appropriate time includes a sufficient buffer (e.g., the appropriate time is earlier than the departure time by at least the predicted duration) to notify a user that the user should begin traveling back to the exit location in time to board the vehicle.

In some examples, the at least one departure time obtained by prediction module 26 of computing device 10 and used for determining the appropriate time may be a last time of departure of transportation services provided by the transportation service from the exit location to a point of origin from which the user began using the transportation service. In other words, prediction module 26 may obtain commercial transportation information from navigation module 24 that indicates the last scheduled departure of a vehicle associated with the transportation service that is scheduled to leave the exit location for the current day and travel back to the point of origin from which the user first began using the transportation service. Prediction module 26 may determine the appropriate time to present context-based travel information so as to alert the user about the last scheduled departure, in-time to notify a user that the user should begin traveling back to the exit location in time to board the last scheduled vehicle to leave the exit location and travel back to the point of origin.

In some examples, prediction module 26 of computing device 10 may determine the appropriate time to present navigation information based, not only on a schedule of transportation services at the exit location, but also in part on a "transaction duration." A transaction duration may represent an amount of time for the user, once at the exit location, to purchase a ticket and/or walk to a platform and board the transportation service. For instance, some airlines may recommend that passengers arrive at an airport at least one hour prior to the scheduled departure to "check-in" and "check baggage." Likewise, a user may expect to experience some delay in purchasing a ticket and/or moving through crowds to walk to a gate, platform, etc. to board the transportation service. The amount of time that a person spends between the moment of arrival at a stop or station, until the person boards the transportation service may be referred to as a transaction duration. A transaction duration may change based on time of day, and other factors such as events, attractions and the like that may be occurring in an area of a stop. In other words, transaction duration may change based on an increase in passenger traffic flow or an amount of congestion at a stop, station and/or terminal at a particular time of day.

Prediction module 26 may obtain a transaction duration at the exit location from navigation module 24. The transaction duration may indicate at least one of a predicted duration of time for the user to board a vehicle associated with the transportation service and a predicted duration of time for the user to purchase a ticket for using the transportation service. Prediction module 26 may determine the appropriate time so that the appropriate time occurs prior to the at least one departure time by at least a combination of the predicted duration and the transaction duration. In other words, prediction module 26 may determine the appropriate time to present context-based travel information so as to alert the user about a scheduled departure, in-time to notify a user that the user should begin traveling back to the exit location in time to board the last scheduled vehicle to leave the exit location, and also notify the user in-time to purchase a ticket for the transportation service and/or walk through a station or to a platform at the exit location to board a vehicle (e.g., a train) associated with the transportation service.

Prediction module 26 may obtain a transaction duration from navigation module 24 in response to a query that navigation module 24 makes to information server system 60. For example, information server system 60 may, in some examples, determine transaction durations associated with stops, stations, and the like, along a route of a transportation service based on an aggregated analysis of passengers flowing through the stops, stations, and the like, including the stop or station at the exit location. Information server system 60 may obtain data that includes the cost of a person to move from an entrance of a station at the exit location to a vehicle associated with the transportation service at different times of day. The cost may be a duration of time. The information server may obtain the cost of n different persons and average the n costs to determine the transaction duration that the user of computing device 10 may experience once at the exit location.

In some examples, prediction module 26 of computing device 10 may receive an indication of a preferred time to arrive at the exit location and determine, based on the preferred time, the appropriate time to output the indication of the predicted duration. The appropriate time determined by prediction module 26 may occur prior to the preferred time by at least the predicted duration. For example, after prediction module 26 determines that the user has exited a transportation service (e.g., the user has disembarked from a vehicle associated with the transportation service, or traveled away from the exit location) prediction module 26 may cause UI module 20 to present a graphical indication that requests information from the user at UID 12. The graphical indication may include one or more check boxes, buttons, text entry regions, etc. for a user to input information in response to the requests. For instance, UI module 20 may present a simple question to the user, such as, "what time would you like to return to this station?" Prediction module 26 may receive from UI module 20, information that indicates a response to the request, such as information that indicates a preferred time to arrive back at the exit location. Prediction module 26 may determine the appropriate time to present context-based travel information, including the indication of the predicted duration, based on the preferred time. For instance, prediction module 26 may subtract the predicted duration from the preferred time to determine the appropriate time to cause UI module 20 to output the indication of the predicted duration for display at UID 12.

Figure 3:
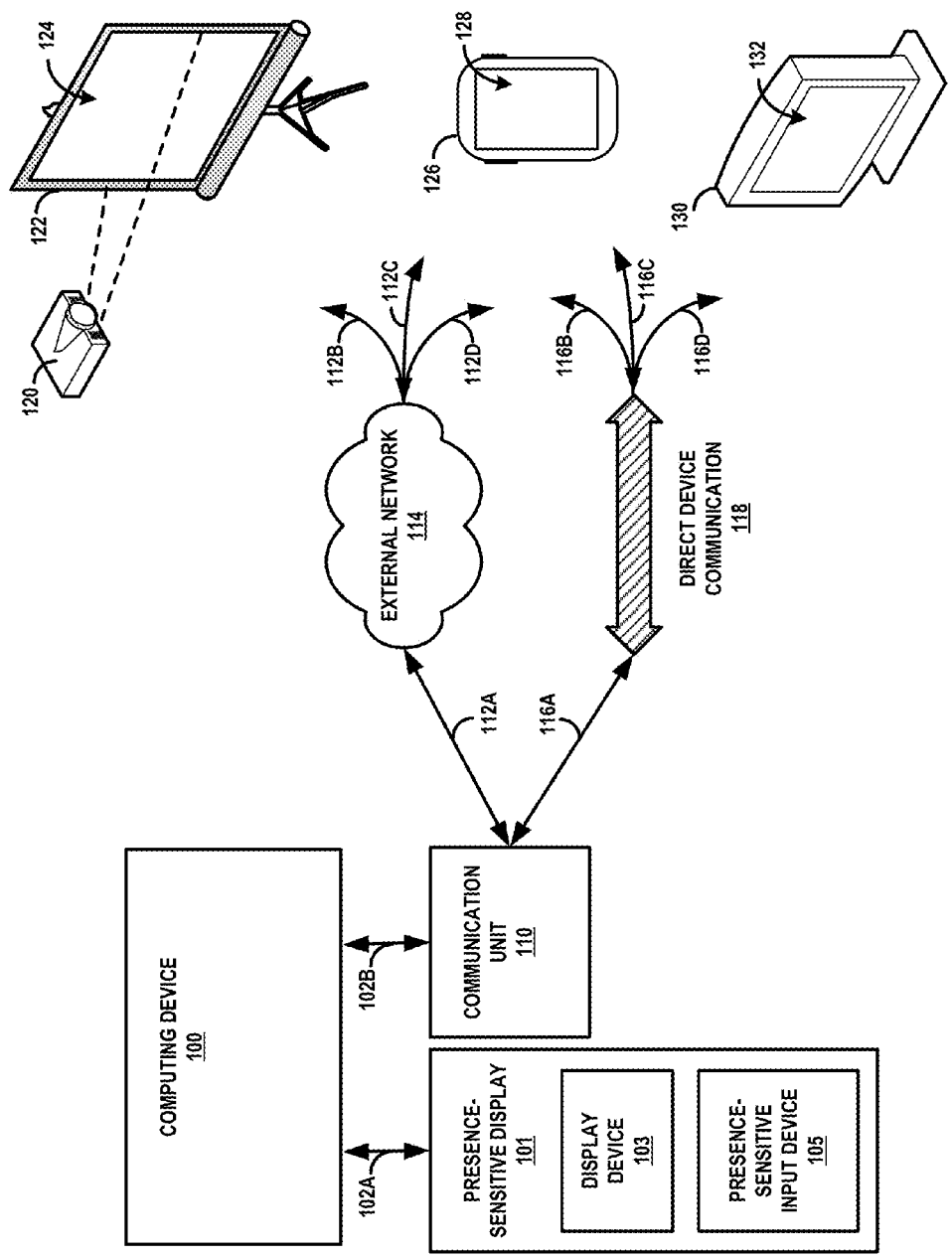
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIGS. 1 and 2 as a stand-alone computing device 10, a computing device such as computing devices 10, 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to processor 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 10 in FIGS. 1-2, a computing device may refer to a portable or mobile device such as mobile phones (including smart phones), laptop computers, computing watches, computing eye glasses, wearable computing devices, etc. In some examples, a computing device may be a desktop computers, tablet computers, smart television platforms, cameras, personal digital assistants (PDAs), servers, mainframes, etc.

Presence-sensitive display 101 may include display device 103 and presence-sensitive input device 105. Display device 103 may, for example, receive data from computing device 100 and display the graphical content. In some examples, presence-sensitive input device 105 may determine one or more inputs (e.g., continuous gestures, multi-touch gestures, single-touch gestures, etc.) at presence-sensitive display 101 using capacitive, inductive, and/or optical recognition techniques and send indications of such input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of communication unit 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Computing device 100 may also include and/or be operatively coupled with one or more other devices, e.g., input devices, output devices, memory, storage devices, etc. that are not shown in FIG. 3 for purposes of brevity and illustration.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, the one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more inputs (e.g., continuous gestures, multi-touch gestures, single-touch gestures, etc.) at projector screen 122 using optical recognition or other suitable techniques and send indications of such input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional functionality. Projector screen 122 (e.g., an electronic display of computing eye glasses), may receive data from computing device 100 and display the graphical content. In some examples, presence-sensitive display 124 may determine one or more inputs (e.g., continuous gestures, multi-touch gestures, single-touch gestures, etc.) at projector screen 122 using capacitive, inductive, and/or optical recognition techniques and send indications of such input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, computerized watches, computerized eyeglasses, etc. Examples of visual display device 130 may include other semi-stationary devices such as televisions, computer monitors, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of UID 12 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more inputs (e.g., continuous gestures, multi-touch gestures, single-touch gestures, etc.) at projector screen using capacitive, inductive, and/or optical recognition techniques and send indications of such input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output the data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 112A-112D may be connections using Bluetooth, Near-Field Communication, Universal Serial Bus, infrared, etc. Such connections may be wireless and/or wired connections.

Computing device 100 may be operatively coupled to visual display device 130 using external network 114. Computing device 100 may determine that a user associated with computing device 100 is using a transportation service. For example, prediction module 26 of computing device 100 may obtain a current location associated with computing device 100 from device location module 22 and also obtain navigation and transportation service information from navigation module 24 that indicates a user associated with computing device 100 is traveling along a route of a transportation service at a speed that is consistent with the speed of travel of a vehicle of the transportation service. Prediction module 26 may determine that a user associated with computing device 100 is using the transportation service. Responsive to determining that the user has exited the transportation service, computing device 100 may obtain an exit location at which the user exited the transportation service. For example, prediction module 26 may obtain additional data or information from navigation module 24 and device location module 22 that indicates the location associated with computing device 100 is no within a distance threshold of the route of the transportation service and/or the speed associated with computing device 100 does not satisfy a speed threshold that corresponds to the speed of travel of the vehicle. Prediction module 26 may query navigation module 24 for a location of the nearest stop along the route of the transportation service and determine the user exited the transportation service at the nearest stop (e.g., the exit location).

Computing device 100 may obtain a predicted duration of travel, by the user, from a current location of computing device 100 to the exit location at which the user exited the transportation service and output, for display, an indication of the predicted duration. For example, as the user travels away from the route of the transportation service, e.g. to a final destination, prediction module 26 of computing device 100 may periodically and/or automatically obtain, from navigation module 24, a predicted duration of travel for the user to travel from the current location of computing device 100 back to the exit location. Prediction module 26 may determine, an appropriate time for presenting the predicted duration to the user. The appropriate time may be a time that is more likely to alert a user (e.g., of the next scheduled transportation service to depart from the exit location in time for the user to travel back to the exit location and board a vehicle associated with the next scheduled transportation service). Prediction module 26 may output context-based travel information (e.g., data about the predicted duration) to UI module 20. UI module 20 send the context-based travel information to visual display device 130 via communication unit 110 and external network 114. In one example, visual display device 130 is a pair of wearable computerized eyeglasses. Visual display device 130 may receive the information and present an indication of the predicted duration, such as information card 16 of user interface 14 of FIG. 1 at display 132 (e.g., a lens of the wearable computerized eyeglasses).

Figure 4:
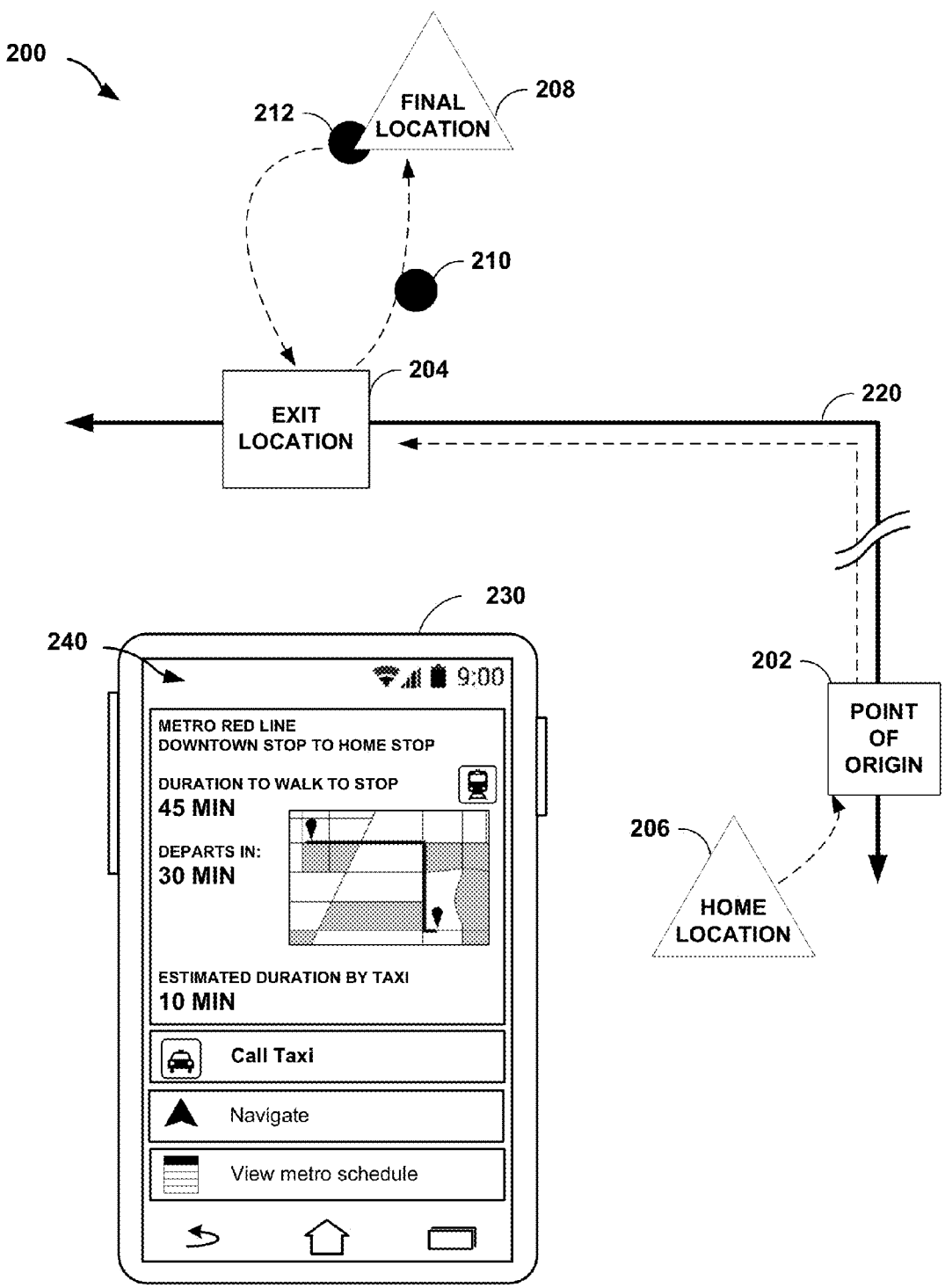
FIG. 4 is a conceptual diagram illustrating an example path of a user of an example computing device using a transportation service, in accordance with one or more aspects of the present disclosure.

FIG. 4 is a conceptual diagram illustrating example path 200 of a user of computing device 230 using a transportation service, in accordance with one or more aspects of the present disclosure. For example, FIG. 4 illustrates an overhead view of a geographical area and dashed lines that indicate path 200 that a user associated with computing device 230 may take when traveling from home location 206 (e.g., a home in a suburb of a city) to final location 208 (e.g., a place of business in the city) using route 220 of a transportation service (e.g., a rail-based transportation service). Computing device 230 in the example of FIG. 4 is a mobile computing device, such as a mobile phone. Computing device 230 presents context-based travel information within user interface 240. Computing device 230 is described within the context of computing device 10 and computing system 1 of FIG. 1.

The user may board a vehicle (e.g., a train) associated with a transportation service at point of origin 202 (e.g., a railway station). At some point in time subsequent to when the user boards the transportation service, computing device 230 may determine that the user associated with computing device 230 is using the transportation service.

As the user travels along route 220, aboard the vehicle associated with the transportation service, computing device 230 may periodically obtain information about the current location associated with computing device 230 and the time, and determine that the user is still using the transportation service. When the vehicle associated with the transportation service that the user is traveling in arrives at exit location 204 (e.g., a stop or station along route 220), the user may disembark from the transportation service and begin walking away from exit location 204 to final location 206 (e.g., the dashed lines between exit location 204 and final location indicate the path that a user may take as he or she travels by foot, bicycle, taxi, etc. to final location 206).

Responsive to determining that the user has exited the transportation service, computing device 230 may obtain information that indicates exit location 204 (e.g., the location of a stop along route 220 closest to where the user exited the transportation service). For instance, computing device 230 may obtain a coordinate location or location identifier of exit location 204 from information server system 60. At one point in time, when the user is traveling near location 210 on his or her way to final location 208, computing device 230 may obtain a predicted duration of travel, by the user, from the current location of computing device 230 (e.g., location 210) to exit location 204 and output, for display, an indication of the predicted duration within user interface 240. At a second point in time when the user is eating at a restaurant at final location 208, computing device 230 may obtain a predicted duration of travel, by the user, from the current location of computing device 230 (e.g., location 208) to exit location 204 and output, for display, an indication of the predicted duration within an updated user interface 240. At a third point in time, when the user stops outside the restaurant at a convenience store at location 212, computing device 230 may obtain a predicted duration of travel, by the user, from the current location of computing device 230 (e.g., location 212) to exit location 204 and output, for display, an indication of the predicted duration within yet another updated user interface 240. In this way, after a user exits from exit location 204 after using a transportation service along route 220, the user is automatically and/or periodically alerted about an estimated amount of time for the user to travel from his or her current location back to exit location 204.

In some examples, computing device 230 may present more context-based travel information than just the predicted duration. For example, as shown in FIG. 4, user interface 240 also includes information about an estimated duration of travel for the user to travel by taxicab from the current location of computing device 10 back to exit location 204 along with a graphical button for calling a taxicab. By providing additional context-based travel information, a computing device according to these techniques may make traveling using a transportation service easier for a user.

Figure 5:
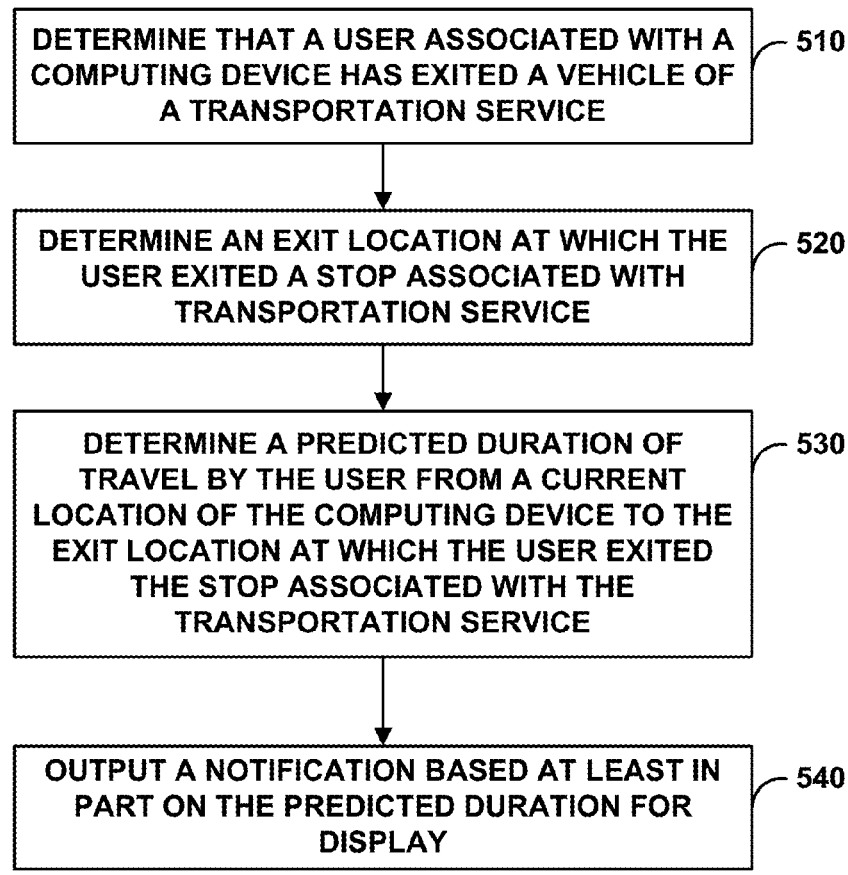
FIG. 5 is a flowchart illustrating example operations of an example computing device configured to present information related to a transportation service, in accordance with one or more aspects of the present disclosure.

FIG. 5 is a flowchart illustrating example operations of the computing device configured to present information related to a transportation service, in accordance with one or more aspects of the present disclosure. The process shown in FIG. 5 may be performed by one or more processors of a computing device, such as computing device 10 and computing device 100 illustrated in FIG. 1, FIG. 2, and FIG. 3. For purposes of illustration, FIG. 5 is described below within the context of computing system 1 of FIG. 1.

Computing device 10 may determine that a user associated with computing device 10 is using a transportation service. For example, prediction module 26 of computing device 10 may obtain data from navigation module 24 and device location module 22 that indicates a user associated with computing device 10 is traveling along a route of a transportation service at a speed consistent with the speed of travel of the transportation service. Computing device 10 may determine that the user associated with computing device 10 has exited a vehicle of the transportation service (500). For example, prediction module 26 may obtain additional data or information from navigation module 24 and device location module 22 that indicates the speed and location associated with computing device 10 no longer indicates that the user associated with computing device 10 is traveling along the route at a speed consistent a vehicle associated with the transportation service may move along the route.

In response to determining that the user has exited the vehicle, computing device 10 may determine an exit location at which the user exited a stop associated with the transportation service (520). For example, after determining that the user is no longer using the transportation service, prediction module 26 may query navigation module 24 for a location of the a stop of the transportation service within a threshold distance (e.g., 5 minutes, one block, etc.) of the current location associated with computing device 10.

Computing device 10 may determine a predicted duration of travel by the user from a current location of computing device 10 to the exit location at which the user exited the stop associated with the transportation service (530). For example, as the user travels away from the exit location, e.g. to a final destination, prediction module 26 of computing device 10 may periodically and/or automatically query navigation module 24 for navigation information including a predicted duration of travel for the user to walk from the current location of computing device 10 back to the exit location.

Computing device 10 may output a notification based at least in part on the predicted duration for display (540). For example, prediction module 26 may cause UI module 20 to output a graphical indication of a notification that includes an indication of context-based travel information, including the predicted duration for display at UID 12.

Computing device 10 may analyze information (e.g., locations, speeds, etc.) associated with computing device 10 only if computing device 10 receives permission from the user to analyze the information. For example, in situations discussed below in which computing device 10 may collect or may make use of information associated with the user and computing device 10, the user may be provided with an opportunity to control whether programs or features of computing device 10 can collect and make use of user information (e.g., information about a user's e-mail, a user's social network, social actions or activities, profession, a user's preferences, or a user's past and current location), or to control whether and/or how to computing device 10 may receive content that may be relevant to the user. In addition, certain data may be treated in one or more ways before it is stored or used by computing device 10, so that personally identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by computing device 10.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:
   determining, by a computing device, a first mode of transportation being used by a user of the computing device, wherein the first mode of transportation is associated with a transportation service;
   determining, by the computing device, an exit location at which the user of the computing device exited a stop associated with the transportation service that the user was previously using;
   subsequent to determining that the user of the computing device has used a second mode of transportation that is not associated with the transportation service, determining, by the computing device, a predicted duration of travel for the user to travel using the second mode of transportation from a current location of the computing device back to the exit location at which the user exited the stop associated with the transportation service that the user was previously using; and
   outputting, by the computing device and for display, a notification based at least in part on the predicted duration.

2. The method of claim 1, wherein determining the exit location comprises responsive to determining that the user of the computing device is using the transportation service, determining the exit location at which the user of the computing device exited the stop associated with the transportation service that the user was previously using.

3. The method of claim 1, wherein determining the exit location comprises responsive to determining that the user has exited a vehicle of the transportation service, determining the exit location at which the user of the computing device exited the stop associated with the transportation service that the user was previously using.

4. The method of claim 1, further comprising:
   determining, by the computing device and based at least in part on a current time and the predicted duration, one or more departure times of transportation services provided by the transportation service at the exit location; and
   outputting, by the computing device and for display, an indication of the one or more departure times.

5. The method of claim 1, further comprising:
   determining, by the computing device, a point of origin from which the user boarded a vehicle associated with the transportation service;
   determining, by the computing device and based at least in part on a current time and the predicted duration, one or more departure times of transportation services provided by the transportation service from the exit location to the point of origin; and
   outputting, by the computing device and for display, an indication of the one or more departure times.

6. The method of claim 1, wherein the stop is a first stop, wherein the predicted duration is a first predicted duration, the method further comprising:

determining, by the computing device, a point of origin from which the user boarded a vehicle associated with the transportation service;

determining, by the computing device and based on the current location, a second predicted duration of travel for the user to travel using the second mode of transportation from the current location of the computing device to a second stop associated with the transportation service, the second stop being a shorter distance from the current location than the exit location;

determining, by the computing device, and based at least in part on the current time, one or more departure times of transportation services provided by the transportation service from the second stop to the point of origin; and outputting, by the computing device and for display, an indication of the one or more departure times.

7. The method of claim 1, further comprising:

determining, by the computing device and based on an updated current location of the computing device, an updated predicted duration of travel for the user to travel using the second mode of transportation from the updated current location to the exit location; and outputting, by the computing device and for display, an indication of the updated predicted duration.

8. The method of claim 1, wherein the stop is an exit stop, the method further comprising:

determining, by the computing device, at a first point in time, a first speed associated with the computing device at a first location that corresponds to a first stop along a route of the transportation service;

determining, by the computing device, at a second point in time, a second speed associated with the computing device at a second location that corresponds to a second stop along the route of the transportation service; and determining, by the computing device, and based at least in part on the first speed and the second speed, that the user is using the transportation service.

9. The method of claim 1, further comprising determining, by the computing device and based at least in part on a schedule of the transportation service, an appropriate time to present the notification, wherein the computing device outputs the notification for display at the appropriate time.

10. The method of claim 9, further comprising:

determining, by the computing device and based on the schedule, at least one departure time of transportation services provided by the transportation service from the exit location, wherein the appropriate time is determined based at least in part on a current time, the at least one departure time, and the predicted duration, and wherein the appropriate time occurs prior to the at least one departure time by at least the predicted duration.

11. The method of claim 10, wherein the at least one departure time is a last time of departure of transportation services provided by the transportation service from the exit location to a point of origin from which the user boarded a vehicle associated with the transportation service.

12. The method of claim 10, further comprising determining, by the computing device, a transaction duration at the exit location, wherein the transaction duration indicates at least one of a predicted duration of time for the user to board a vehicle associated with the transportation service and a predicted duration of time for the user to purchase a ticket for using the transportation service, wherein the appropriate time occurs prior to the at least one departure time by at least a combination of the predicted duration and the transaction duration.

13. The method of claim 9, further comprising;

receiving, by the computing device, an indication of a preferred time to arrive at the exit location; and determining, by the computing device, and based at least in part on the preferred time, the appropriate time to output the notification based at least in part on the predicted duration, wherein the appropriate time occurs prior to the preferred time by at least the predicted duration.

14. A system comprising:

a display device;

at least one processor; and at least one module operable by the at least one processor to:

determine a first mode of transportation being used by a user, wherein the first mode of transportation is associated with a transportation service;

determine an exit location at which the user exited a stop associated with the transportation service that the user was previously using;

subsequent to determining that the user of the computing device has used a second mode of transportation that is not associated with the transportation service, determine a predicted duration of travel for the user to travel using the second mode of transportation from a current location of the system back to the exit location at which the user exited the stop associated with the transportation service that the user was previously using; and output, for display at the display device, a notification based at least in part on the predicted duration.

15. The system of claim 14, wherein the at least one module is further operable by the at least one processor to:

determine, based at least in part on a schedule of the transportation service, an appropriate time to present the notification; and output, for display, at the display device and at the appropriate time, the notification.

16. The system of claim 15, wherein the at least one module is further operable by the at least one processor to:

determine, based on the schedule, at least one departure time of transportation services provided by the transportation service from the exit location; and determine the appropriate time based at least in part on a current time, the at least one departure time, and the predicted duration, wherein the appropriate time occurs prior to the at least one departure time by at least the predicted duration.

17. The system of claim 14, wherein the stop is an exit stop, wherein the at least one module is further operable by the at least one processor to:

determine, at a first point in time, a first speed associated with the system at a first location that corresponds to a first stop along a route of the transportation service;

determine, at a second point in time, a second speed associated with the system at a second location that corresponds to a second stop along the route of the transportation service; and determine, based at least in part on the first speed and the second speed, that the user is using the transportation service.

18. A system comprising:

at least one processor; and at least one module operable by the at least one processor to:

receive, from a mobile computing device, information that indicates a current location of a mobile computing device;

determine a first mode of transportation being used by a user of the mobile computing device, wherein the first mode of transportation is associated with a transportation service;

determine, based on the current location, an exit location at which the user associated with the mobile computing device exited a stop associated with the transportation service that the user was previously using;

subsequent to determining that the user of the computing device has used a second mode of transportation that is not associated with the transportation service, determine a predicted duration of travel for the user to travel using the second mode of transportation from the current location of the mobile computing device back to the exit location at which the user exited the stop associated with the transportation service that the user was previously using; and transmit, to the mobile computing device, an indication of the predicted duration.

19. The system of claim 18, wherein the at least one module is further operable by the at least one processor to:

responsive to determining that the user associated with the mobile computing device is using the transportation service, determine a point of origin along the route of the transportation service from which the user boarded a vehicle of the transportation service; and transmit, to the mobile computing device, an indication of the point of origin.

20. The system of claim 18, wherein the at least one module is further operable by the at least one processor to:

receive, from the mobile computing device, additional information that indicates a current speed of the mobile computing device; and responsive to determining that the current speed satisfies a speed threshold associated with a vehicle traveling on the route of the transportation service, determine that the user associated with the mobile computing device is using the transportation service.

21. The system of claim 18, wherein the at least one module is further operable by the at least one processor to:

responsive to determining that the current location is within a distance threshold of a route of a transportation service, and prior to determining the exit location at which the user associated with the mobile computing device exited the stop associated with the transportation service, determine, that the user associated with the mobile computing device is using the transportation service; and transmit, to the mobile computing device, an indication that the user associated with the mobile computing device is using the transportation service.

22. The system of claim 18, wherein the at least one module is further operable by the at least one processor to:

determine, based on the current location, that the user has exited a vehicle associated with the transportation service;

responsive to determining that the user has exited the vehicle associated with the transportation service, determine the exit location of the stop associated with the transportation service that the user was previously using from which the user exited the vehicle; and transmit, to the mobile computing device, an indication of the exit location.

* * * * *